United States Patent [19]
Powers

[11] Patent Number: 5,993,646
[45] Date of Patent: Nov. 30, 1999

[54] GREASE TRAP

[75] Inventor: James S. Powers, Berryville, Ark.

[73] Assignee: Norwood Industries, Inc., Norwood, Mass.

[21] Appl. No.: 09/071,225

[22] Filed: May 1, 1998

[51] Int. Cl.[6] .................................................. C02F 1/40
[52] U.S. Cl. ........................... 210/86; 210/95; 210/521; 210/538; 210/540
[58] Field of Search ............................. 210/86, 95, 521, 210/538, 540

[56] References Cited

U.S. PATENT DOCUMENTS

| | | | |
|---|---|---|---|
| 329,791 | 11/1885 | Westinghouse et al. | 210/538 |
| 357,349 | 2/1887 | Waving, Jr. | 210/538 |
| 723,618 | 3/1903 | Newton | 210/538 |
| 2,277,254 | 3/1942 | Ridge et al. | 210/540 |
| 2,763,335 | 9/1956 | Janssen | 182/9 |
| 2,782,929 | 2/1957 | Colket | 210/540 |
| 4,123,365 | 10/1978 | Middelbeck | 210/521 |
| 4,208,291 | 6/1980 | Ochoa | 210/522 |
| 4,351,733 | 9/1982 | Sulzer et al. | 210/521 |
| 4,400,274 | 8/1983 | Protos | 210/521 |
| 4,422,931 | 12/1983 | Wolde-Michael | 210/540 |
| 5,266,191 | 11/1993 | Greene et al. | 210/538 |
| 5,505,860 | 4/1996 | Sager | 210/519 |
| 5,705,055 | 1/1998 | Holloway et al. | 210/115 |
| 5,714,069 | 2/1998 | Sager | 210/519 |
| 5,753,115 | 5/1998 | Monteith | 210/521 |
| 5,820,825 | 3/1996 | Rice | 210/521 |

FOREIGN PATENT DOCUMENTS 432557  8/1924  Germany.

Primary Examiner—Christopher Upton
Attorney, Agent, or Firm—Frank G. Morkunas

[57] ABSTRACT

A grease trap having an inlet member, a discharge member, a plurality inner walls defining chambers within, and a relief member for flushing accumulated waste matter. In general order of fluid flow, the chambers include an inlet chamber, a preliminary chamber, an outlet chamber, a discharge chamber, and a reservoir chamber. A first orifice on one inner wall permits passage of fluid from the inlet chamber to the preliminary chamber, a second orifice on another inner wall permits passage of fluid from the preliminary chamber to the outlet chamber, and a third orifice on another inner wall permits passage of fluid from the outlet chamber to the discharge chamber. The relief member has a cap and is coupled to the reservoir chamber. The inner walls defining the chambers are of a height approximately between 70 Length % to 95 Length % of the height of the outer walls of the device to permit for a waste accumulation layer. A gauge member adjacent to the reservoir chamber is adapted to view waste accumulation which, when necessary, is flushed through the relief member via the reservoir chamber.

9 Claims, 2 Drawing Sheets

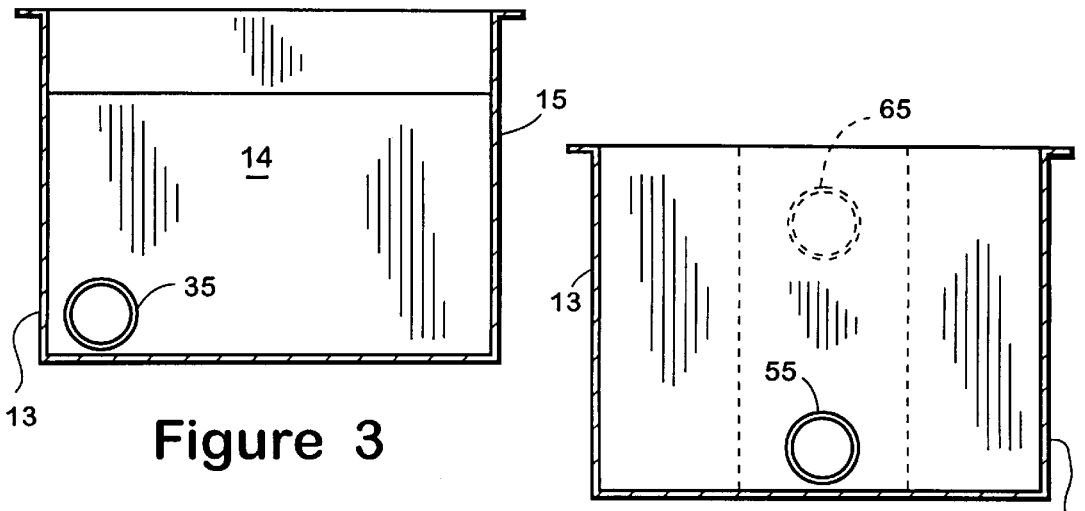
Figure 3
Figure 5
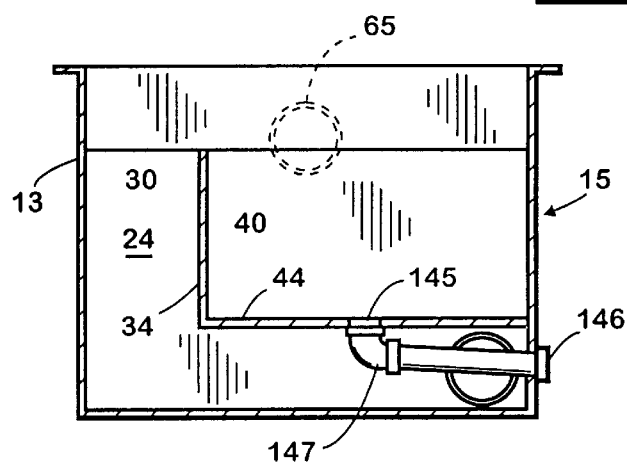
Figure 4
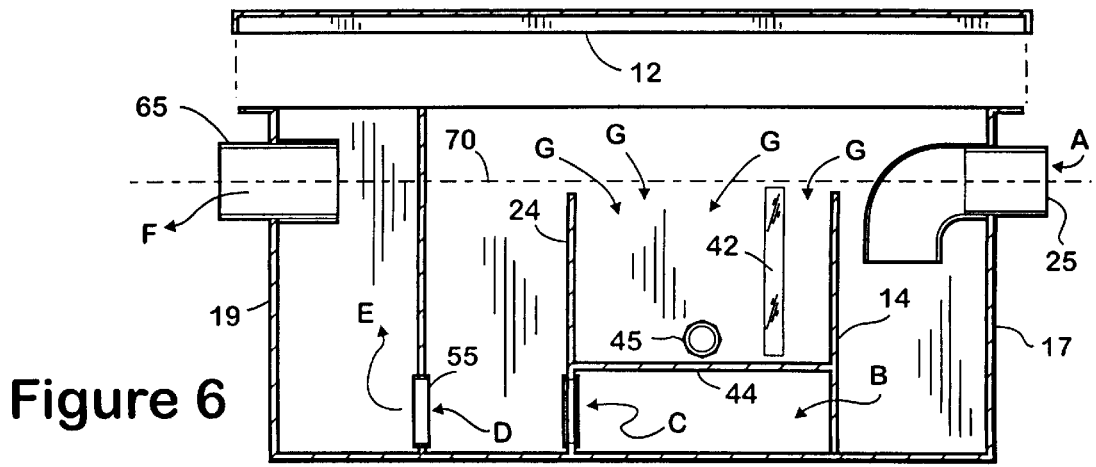
Figure 6

GREASE TRAP

CROSS REFERENCES TO RELATED APPLICATIONS

Not applicable.

STATEMENT REGARDING FEDERALLY-SPONSORED RESEARCH OR DEVELOPMENT

Not applicable.

BACKGROUND OF THE INVENTION

This present invention relates to an improvement in grease traps, and more particularly to a device for collecting, separating, and simply and easily removing grease from effluent streams emanating from restaurants, various food processing facilities, and other similar facilities.

Grease traps of varying configurations are well known in the prior art. Some are of simple design while others are complex and/or fully automated. These include U.S. Pat. No. 2,763,335 issued to Janssen on Sept. 18, 1956 (a simple grease trap design to catch for later manual disposition of grease, the trap having a plurality of removable partitions with staggered openings creating a tortuous effluent flow path); U.S. Pat. No. 5,505,860 issued to Sager on Apr. 9, 1996 (also of relatively simple design structured to separate and retain grease apart from clean water flow for later manual removal of the retained grease); and U.S. Pat. No. 5,705,055 issued to Holloway on Jan. 6, 1998 (a more complex separator and automated grease removal apparatus).

While these prior art devices are suited for their intended purpose none is as simple in construction and operation as is the present invention which captures and separates grease from water and permits removal of grease therefrom in a cleaner, faster, and less costly manner without interrupting facility operations.

Accordingly, several objects and advantages of my invention are to:

a. provide a grease trap which is easy to use;
b. provide a grease trap which is easy to install and which is compatible with virtually most existing effluent discharge systems;
c. provide a grease trap which is simple in structure;
d. provide a grease trap which is inexpensive to operate;
e. provide a grease trap which is virtually maintenance-free; and
f. provide a grease trap which is inexpensive to manufacture and, consequently, to purchase.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a grease trap having an inlet member, a discharge member, a plurality of chambers within, a relief member, and a cap for the relief member. Effluent enters via the inlet member and exits via the discharge member. Accumulated waste matter is flushed via the relief member. The chambers within include, in order of effluent flow, an inlet chamber, a preliminary chamber, an outlet chamber, a discharge chamber, and a reservoir chamber. A first orifice is structured to permit passage of effluent from the inlet chamber to the preliminary chamber, a second orifice is structured to permit passage of effluent from the preliminary chamber to the outlet chamber, and a third orifice is structured to permit passage of effluent from the outlet chamber to the discharge chamber. The relief member is coupled to the reservoir chamber and permits passage of waste matter out from the device. The inner walls defining the chambers are of a height approximately between 70 Length % to 95 Length % of the height of the outer walls of the device. A gauge member adjacent to the reservoir chamber permits viewing the accumulation and depth of the waste matter which is flushed from the device through the relief member via the reservoir chamber when necessary. Flushing is accomplished without shutting down operations or removing the grease trap cover.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 3 is a cross section side elevation view of the grease trap as taken on line 3—3 of FIG. 2.

FIG. 4 is a cross section side elevation view of the grease trap as taken on line 4—4 of FIG. 2.

FIG. 5 is a cross section side elevation view of the grease trap as taken on line 5—5 of FIG. 2.

FIG. 6 is a cross section front elevation view of the grease trap as taken on line 6—6 of FIG. 2.

DETAILED DESCRIPTION OF THE INVENTION

Figure 1:
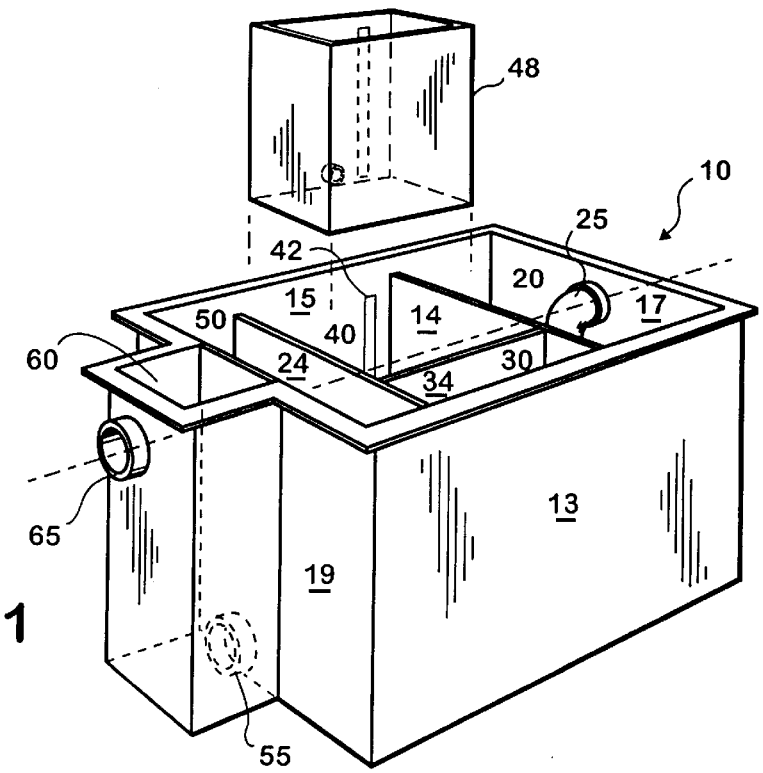
FIG. 1 is perspective view of the grease trap without its cover.

Referring now to the drawings in detail and in particular to FIG. 1, reference character 10 generally designates the improved grease trap device constructed in accordance with a preferred embodiment of the present invention (the cover 12 of the device 10 has been and is not illustrated in this figure but is shown in FIG. 6). For clarity and reference purposes only and not by way of limitation, the outer walls of the device 10 are referred to as front wall 13, rear wall 15, first end wall 17 (or first end), and second end wall 19 (or second end). This view illustrates the internal structure of the device 10. The device 10 has a plurality of inner walls 14, 24, 34 further defining a plurality of chambers 20, 30, 40, 50 therein as well as another chamber 60 external to the second end 19.

Figure 2:
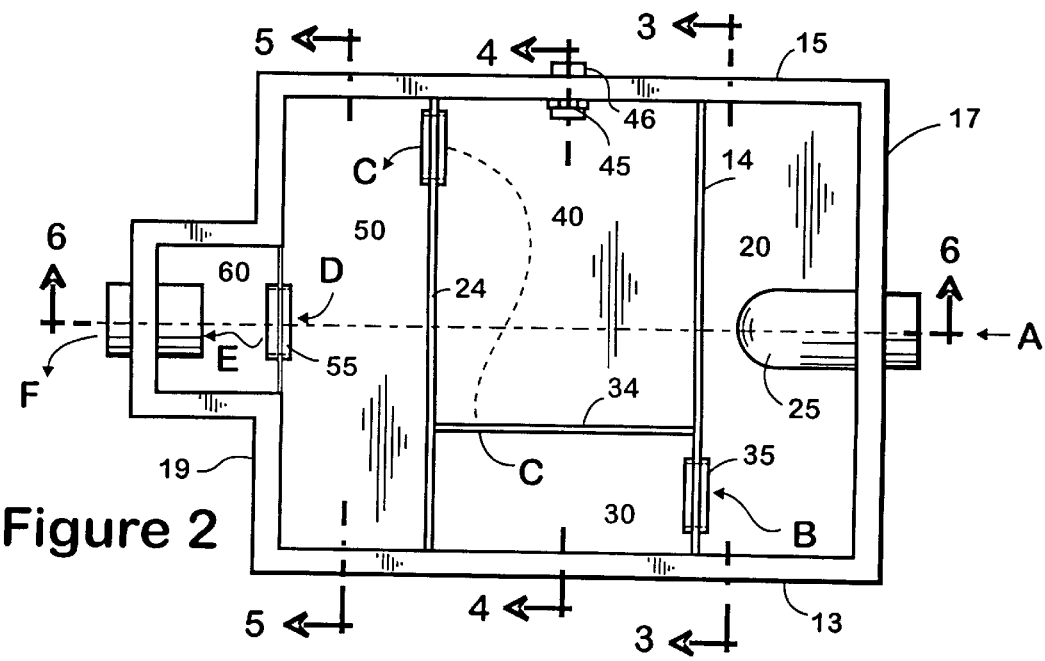
FIG. 2 is a plan view of the grease trap without its cover.

Referring to FIGS. 1 and 2, a first inner wall 14 near to the first end 17 connects to the inside bottom of the device 10 from its front wall 13 to its rear wall 15. This first inner wall 14 defines the inlet chamber 20. An inlet member 25 which permits entry of fluids into the device from without is positioned on the first end 17.

A second inner wall 24, on the opposite end of the inlet member 25 and near to the second end 19, also connects to the inside bottom of the device 10 from its front wall 13 to its rear wall 15. This second inner wall 24 defines the outlet chamber 50. A third inner wall 34 connects between the first inner wall 14 and the second inner wall 24 to thereby define a preliminary chamber 30 and a reservoir chamber 40. A self-containing discharge chamber 60 is connected on the outer side of the left side 17 of the device. The height of the discharge chamber 60 is approximately equal to the height of the outer walls of the device 10. A discharge member 65, attached to the discharge chamber 60 permits passage of fluids out from the device 10. A cover 12 (shown in FIG. 6) covers and seals the device 10 and each of its chambers.

The third inner wall 34 may connect to the bottom of the device 10 thereby defining a preliminary chamber 30 and a reservoir chamber 40 having common floors or, as illustrated in FIG. 4, it may extend downward but not connect to the bottom of the device 10. In the latter case, a fourth inner wall 44, beginning at the bottom end of the third inner wall 34, is connected to the third inner wall 34. The fourth inner wall 44 extends rearward to the rear wall 15 of the device 10 and connects thereat defining a floor to the reservoir chamber 40. With this configuration, the preliminary chamber 30 becomes somewhat L-shaped. This is the preferred embodiment of my invention.

In addition to the inlet member 25 and the discharge member 65, a relief member 45 within the reservoir chamber 40 provides for fluid communication between outside the device 10 and the device 10. In the preferred embodiment (as illustrated in FIGS. 2 and 6), the relief member 45 is connected to an outer wall (in this illustration the rear wall 15) at a point adjacent to the floor or fourth inner wall 44. It is preferred that the relief member 45 be approximately centered in the reservoir chamber 40. A removable cap 46 permits fluid retention within the reservoir chamber 40 when capped to the relief member 45 or permits fluid release from the reservoir chamber 40 when uncapped from the relief member 45.

An alternate embodiment for release from the reservoir chamber 40 is illustrated in FIG. 4. Here the relief member 145 is positioned in the center of the floor 44 of the reservoir chamber 40. A conduit 147 is connected to the relief member and to the rear wall 15. A removable cap 146 is removably connected to the conduit 147. When connected, the reservoir chamber 40 retains fluid and when removed, the reservoir chamber 40 releases fluid therefrom. The floor 44 may be downwardly angled toward the relief member 145 to thereby facilitate the fluid flow when the cap 146 is removed.

Reference is now made to FIGS. 2 through 5. Fluid or effluent enters the device through the inlet member 25 in the general direction of Arrow A and into the inlet chamber 20.

A first orifice or passage 35 on the first inner wall 14 permits passage of fluid in the general direction of Arrow B from the inlet chamber 20 to the preliminary chamber 30. Fluid continues in the general direction of Arrow C beneath the floor 44 and through a second orifice, which is on the second inner wall 24, and into the outlet chamber 50.

As fluid enters and begins to fill in the outlet chamber 50 it will pass in the general direction of Arrow D into the discharge chamber 60 via the third orifice or passage 55 located between and communicating with the discharge chamber 60 and the outlet chamber 50. FIG. 5 illustrates the general placement of the third orifice 55. Generally, the third orifice 55 should be proximal to the bottom of the device 10 but may be located further upward and closer in height to the discharge member 65. The further away the third orifice 55 is from the discharge member 65 the better the operation of the device 10. As the device fills to the top of its walls 14, 24, and 34, fluid will spill over the walls and into the reservoir chamber 40. With the cap 46 secured to the relief member 45, the reservoir chamber 40 also will fill.

Reference is now turned to FIGS. 2 and 6. As the fluid level in the device 10 rises and passes into the discharge chamber 60, it will rise within the discharge chamber 60 in the general direction of Arrow E. When the fluid level reaches the lower end of the discharge member 65, the fluid will exit the device 10 following the general direction of Arrow F.

All of the inner walls 14, 24, 34 of the chambers 20, 30, 40, 50 are generally shorter in height than the height of the outer walls of the device 10. The purpose behind this configuration is to keep the effluent level below that of the cover 12 and to permit grease, or similar waste matter having a lower specific gravity than water, to accumulate and form a layer at or near the top of the effluent level. Because of this principle, the inner walls, and through the direction of flow the device 10 forces the fluid stream to flow, grease and similar waste matter remains on the top and relatively clean water is discharged from the discharge member 65.

As the waste matter accumulates, its layer thickens and increases in size extending further downward thereby decreasing the amount of relatively clear water. If this layer were permitted to accumulate unabated the device 10 would clog with waste matter accumulation. My invention is fitted with a gauge member 42 which discerns for a user the amount of waste accumulation within the device 10.

In the preferred embodiment, the gauge member 42 is a vertical strip on the rear wall 15 which permits viewing the fluid contained within the reservoir chamber 40 to determine the depth of the waste layer. The strip may be made of any transparent or translucent material. The top of such a gauge member 42 should be at a height which is at or near the height or top of the defining walls 14, 24, 34 of the reservoir chamber 40. As the waste accumulates, one can see the thickness of depth of the waste layer within the reservoir chamber 40. This accumulation is generally representative of the overall depth of accumulation within the device 10. Although a vertical strip of a transparent or translucent quality is preferred for the gauge member 42, any suitable mechanical or electrical detection device, suited for the intended purpose, may be utilized.

To clear the device 10 of this waste accumulation, the cap 46 from the relief member 45 is removed. The pressure and force created after the relief member 45 is opened causes the effluent within the reservoir chamber 40 to pass through the relief member 45 and out of the device 10. The force also attracts and pulls the entire waste layer in the general direction of Arrows G, into the reservoir chamber 40, and out the device 10 through the relief member 45 flushing the device 10 of this waste. This cleansing process can be performed without shutting down the fluid stream into the device 10 thereby permitting continued operations. The same flushing operation occurs with the alternate embodiment relief member 145, cap 146, and conduit 147 as illustrated in FIG. 4.

When too much grease has accumulated within the reservoir chamber 40 such that flushing via the relief member 45 is impractical or difficult, the cover 12 may be removed from the device 10 and the device cleaned manually. Another cleaning option entails a removable insert 48 housed within the reservoir chamber 40 (illustrated in FIG. 1). With this embodiment, the cover 12 must be removed. Once removed, the insert 48 may likewise be removed from the reservoir chamber 40 and with it a significant portion of the accumulated waste matter. Cleaning waste from this embodiment, however, generally entails shutting down the operation of the device 10 until it has been cleaned. This embodiment is best suited for subterranean grease traps. It may, but need not have, a relief member 45 and/or a gauge member 42. In either case, and with either embodiment, the cleaning operation is simplified.

I have also found that this device 10 operates more efficiently when the centers 70 of the inlet member 25 and the discharge member 65 are in planar alignment with one another as illustrated in FIG. 6. In addition, the height of the inner walls 14, 24, 34 should be approximately between 70 Length % and 95 Length % of the wall height of the outer walls of the device 10. With these respective height configurations I have found that waste accumulation and its elimination process are facilitated. The accumulation and elimination process functions better when the top surfaces of the inner walls 14, 24, 34 are in approximate alignment with the centers 70 of the inlet member 25 and the discharge member 65. Best results, however, have been achieved when the top surfaces of the inner walls 14, 24, 34 are approximately equidistant between the centers 70 of the inlet member 25 and the discharge member 65 and the lower sections of these members.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A grease trap device having outer walls, a bottom connected to the outer walls, and a cover to cover said grease trap, said grease trap comprising:
   a. an inlet member on one outer wall, said inlet member having a center and a lower end;
   b. a discharge chamber on another outer wall opposing said inlet member, said discharge chamber further having an outlet member thereon, said outlet member having a center and a lower end;
   c. a first inner wall adjacent to said inlet member, connected to the bottom, and extending from one outer wall to an opposing outer wall and defining an inlet chamber in said device;
   d. a second inner wall adjacent to said discharge chamber, connected to the bottom, and extending from one outer wall to an opposing outer wall and defining an outlet chamber in said device;
   e. a third inner wall connected to said first inner wall and to said second inner wall defining a reservoir chamber on one side of said third inner wall and an preliminary chamber on another side of said third inner wall;
   f. a relief member connected to said reservoir chamber, said relief member in communicating relation to an outer wall of said device;
   g. a first orifice in said first inner wall communicating said inlet chamber with said preliminary chamber;
   h. a second orifice in said second inner wall communicating said preliminary chamber with said outlet chamber; and
   i. a third orifice in one of said outer walls, said third orifice communicating said outlet chamber with said discharge chamber.

2. The device as defined in claim 1 further comprising a removable insert fitted within said reservoir chamber.

3. The device as defined in claim 1 further comprising a gauge member for discerning effluent levels within said device, said gauge member connected to an outer wall adjacent to said reservoir chamber.

4. The device as defined in claim 1 further comprising a fourth inner wall connected to said first inner wall, to said second inner wall, to said third inner wall, and to an outer wall thereby defining a floor for said reservoir chamber above the bottom of said device.

5. The device as defined in claim 1 wherein said first, second, and third inner walls each have top surfaces wherein said top surfaces are positioned at a height approximately between 70 Length % and 95 Length % of a wall height of said outer walls.

6. The device as defined in claim 1 wherein said intake member center and said discharge member center are approximately in planar alignment with one another.

7. The device as defined in claim 6 wherein said first, second, and third inner walls each have top surfaces wherein said top surfaces are approximately in planar alignment with said centers of said intake member and said discharge member.

8. The device as defined in claim 6 wherein said first, second, and third inner walls each have top surfaces wherein said top surfaces are in planar alignment with one another at a height approximately equidistant between said centers and said lower ends of said intake member and said discharge member.

9. The device as defined in claim 1 wherein said relief member further comprises a removable cap for retaining effluent therein when said relief member is capped and for releasing effluent therein when said relief member is uncapped.

* * * * *